United States Patent [19]

Peerlkamp

[11] Patent Number: 4,457,729
[45] Date of Patent: Jul. 3, 1984

[54] POLYOLEFIN LAYER WITH IMPROVED ADHESION TO A FOAMED PLASTIC SUBSTRATE AND A METHOD FOR ITS MANUFACTURE

[75] Inventor: Erik R. Peerlkamp, Born, Netherlands

[73] Assignee: Stamicarbon B.V., Geleen, Netherlands

[21] Appl. No.: 298,252

[22] Filed: Aug. 31, 1981

[30] Foreign Application Priority Data

Aug. 30, 1980 [NL] Netherlands ............... 8004959

[51] Int. Cl.$^3$ .............. B29D 27/04; A63C 15/00; B32B 5/20; B32B 27.32
[52] U.S. Cl. ................... 441/74; 264/45.7; 264/46.6; 264/267; 264/310; 428/71; 428/318.4; 428/319.9
[58] Field of Search ............ 264/45.7, 46.6, 25; 441/74; 428/71, 313.5, 317.1, 318.4, 319.9

[56] References Cited

U.S. PATENT DOCUMENTS

| | | | |
|---|---|---|---|
| 2,715,075 | 8/1955 | Wolinski | 264/25 X |
| 3,187,069 | 6/1965 | Pincus et al. | 264/46.8 |
| 3,426,110 | 2/1969 | Kesling | 264/45.7 |
| 3,527,667 | 9/1970 | Larsen et al. | 428/461 |
| 3,607,987 | 9/1971 | Walton et al. | |
| 3,639,189 | 2/1972 | Hartman | 156/244 |
| 3,923,937 | 12/1975 | Piccioli et al. | 264/45.7 |
| 3,936,565 | 2/1976 | Good | 264/45.7 X |
| 3,995,984 | 12/1976 | Fetherston et al. | 425/521 |
| 4,104,335 | 8/1978 | Allen | |
| 4,158,686 | 6/1979 | Boeckmann | 264/45.7 |
| 4,167,382 | 9/1979 | Freedman | 425/256 |
| 4,255,221 | 3/1981 | Young | 156/382 |
| 4,307,133 | 12/1981 | Haselier | 427/195 |

FOREIGN PATENT DOCUMENTS

| | | | |
|---|---|---|---|
| 251057 | 1/1963 | Australia | 264/46.6 |
| 714619 | 7/1965 | Canada | |
| 2617357 | 11/1976 | Fed. Rep. of Germany | |
| 1494897 | 12/1977 | United Kingdom | |
| 1532629 | 11/1978 | United Kingdom | |

OTHER PUBLICATIONS

35 Plastics Engineering, Oct. 1979, pp. 1, 47–49.
9 Encycl. Poly. Sci. Tech., pp. 1, 118–137 (1968).

Primary Examiner—Philip E. Anderson
Attorney, Agent, or Firm—Cushman, Darby & Cushman

[57] ABSTRACT

A rotational molding process for manufacturing objects having a foamed plastic substrate adhered to an outer polyolefin coating layer, and having improved adhesion therebetween comprising the combination of steps of: preparing a first outer coating layer of a stabilized polyolefin; forming a second inner layer of an at most slightly stabilized polyolefin contiguous with and on the interior surface of said first outer layer; and thereafter introducing a foamable plastic material onto the interior surface of said second layer and foaming said plastic material thereagainst thereby the foamed plastic is bonded to said second interior surface.

9 Claims, 3 Drawing Figures

POLYOLEFIN LAYER WITH IMPROVED ADHESION TO A FOAMED PLASTIC SUBSTRATE AND A METHOD FOR ITS MANUFACTURE

SUMMARY AND BACKGROUND OF THE INVENTION

The invention relates to processes for manufacturing objects having a plastic substrate, preferably a plastic foam, covered by a polyolefin layer which has improved adhesion to the plastic substrate.

Polyolefin plastics are more or less inert because of the structure. Polyolefins, such as polyethylene and polypropylene, are produced on a very large scale. Comparatively, polyethylene is more inert than polypropylene and is difficult or impossible to bond to other materials. It adheres hardly or not at all to substrates such as, for example, metal surfaces or foamed plastics. To adhere polyethylene to a substrate, an adhesive must be used, or the surface of the polyethylene or the substrate must be etched. However, adhesives effect only a limited degree of adhesion due to the poor bonding properties of polyethylene. Moreover using adhesives requires extra treatment steps, which correspondingly increases the cost and price. Etching one or both surfaces of the materials being bonded together is a laborous process, which, like the application of adhesives, lengthens production time while increasing the cost and price. Similar difficulties are encountered when polypropylene is used.

It is already known that objects can be made by heating powdered plastic in a mold. The powder melts on the hot wall and and forms a layer. Foam structures can be prepared by introducing foam layers or placing foam against a plastic to improve insulating properties or to limit the weight of the objects. The surface layer and the foamed or unfoamed layer in contact with it should adhere to each other. Particularly with polyethylene and polypropylene as well, the adhesion leaves much to be desired.

This problem has been encountered particularly in the manufacture of surf boards, which are generally made by rotational molding, to form an outer wall of polyethylene. In particular high or medium density polyethylene is employed. High or medium density means at least 0.930 g/ml. However, it is possible to use lower density polyethylenes. The space in between the surface layers is filld with a polyurethane foam resulting in an object having polyurethane foam coated with polyethylene.

The polyethylene coating may get damaged during use. Water can then penetrate into the foam. If there is good adhesion between the surface wall and foam, damage is less likely to occur. With good adhesion, water can only penetrate into the foam under the damaged spot. With poor adhesion between the sirface wall and the foam water can seep between the surface wall and foam and can thus be absorbed by all the foam. Consequently, a need for good adhesion is desired for all polyolefin coated plastics.

Good adhesion is highly desirable for surf boards in particular and for other composite objects built up of similar components.

Improved adhesion of polyethylene to metal substrates by blending the polyethylene with oxidized linear polyethylene is claimed in U.S. Pat. No. 3,639,189. The oxidized polyethylene is obtained by heating linear polyethylene in an oxygen atmosphere at temperatures that may range from about 90° C. up to the crystalline melting point of the polyethylene until the desired degree of oxidation has been reached. Next, the oxidized polyethylene is melt-blended with the oxidized polyethylene, and granulated. The thus obtained granulate is used for the layers applied to a metal substrate. Oxidizing polyethylene is a laborious process and increases the cost and price.

Such already known compositions suffer from several drawbacks. Such compositions are less suited for manufacturing, for example, surf boards, because oxidized polyethylene lowers the resistance of the polyethylene compositon to atmospheric attack. More specifically, the resistance to thermal and oxidative attack is lowered. In particular, it is highly undesirable for an outer wall, such as the polyethylene coating of a surf board which is exposed to outdoor atmospheric influence, to have lowered atmospheric attack and weather resistance. This drawback could be overcome by including more stabilizers in the polyethylene composition, however this further increases the costs and price.

Moreover, using compositions containing oxidized polyethylene to manufacture objects in a mold, for instance by rotational molding, has the further disadvantage that oxidized polyethylene compositions adhere to the mold surfaces. Even if non-oxidized polyethylene is used, release agents must also be applied in order to facilitate the release of the polyethylene object from the mold. When oxidized polyethylene is employed difficulties are still encountered in removing the object from the mold even if release agents are applied.

It has already been attempted to improve other properties in addition to adhesion by applying a cross-linked polyolefin, by preference cross-linked polyethylene, or by cross-linking the polyethylene after it has been formed into a surface layer. This improves adhesion characteristics. However, disadvantageously damage to the surface layer remains difficult or impossible to repair.

It has now been found that improved polyolefin adhesion, in particular polyethylene, to a subtrate can be effected in a mold by producing a surface layer of a stabilized polyethylene in the mold and then employing hardly stabilized or unstabilized polyolefin to form a second layer on the inside surface of the first layer in the mold. The substrate, for example, can be another plastic such as polyurethane foam.

DETAILED DESCRIPTION

Figure 1:
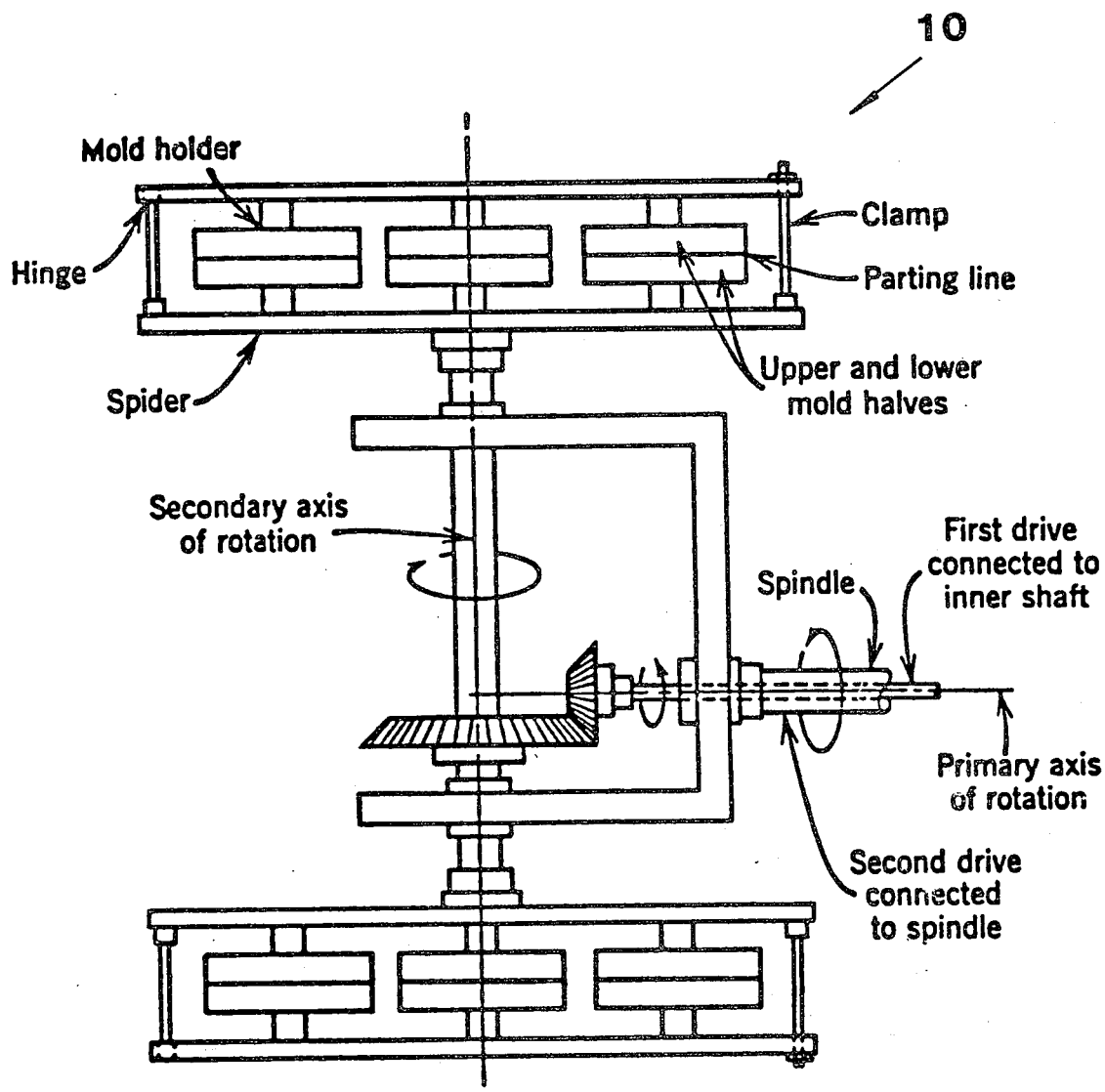
FIG. 1 illustrates a mechanism for a bi-axially rotated mold.
Figure 2:
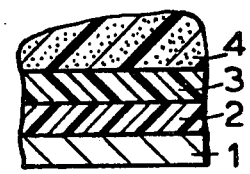
FIG. 2 illustrates in a cross section the mold wall 1, the outer stabilized polyolefin layer 2, the inner polyolefin unstabilized layer 3, and a foamed plastic material 4.
Figure 3:
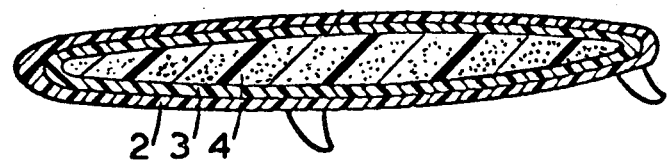
FIG. 3 illustrates in a longitudinal cross section the surf board portion of a wind surf board (mast and sail not shown) having a foamed plastic core 4 contiguous with and adhering to unstabilized polyolefin layer 3 and outer stabilized polyolefin layer 2 contiguous with and adhering to unstabilized polyolefin layer 3.

The polyolefin layering process according to the present invention whereby an exterior first layer of stabilized polyolefin is covered on the interior mold side thereof with a second layer of unstabilized or hardly stabilized polyolefin prior to introducing a foaming plastic into the thus defined volume is particularly suited for application in rotational molding. Polyolefin surface layers made according to the process of the present invention can easily be repaired by melt-welding when damaged. Such repairs cannot, or with only little success, be accomplished with already known cross-linked materials, or, as already known, if the material has been cross-linked afterwards.

So-called rotational molding is a procedure in which a quantity of a synthetic thermoplastic is introduced into a mold 10 capable of rotating and/or rocking about one or more axes. The mold 10 is heated to a temperature above the melting point of the plastic and the slow rotational or rocking motion of the mold 10 evenly distributes the powder over the mold surface.

A number of layers can be formed by introducing another quantity of the same or a different plastic, such as polyolefin plastics, into the mold. The space between the polyolefin layers formed on the wall of the mold can be filled out with foam, for instance polyurethane foam. The foam should adhere to the polyolefin layers. The whole polyolefin-foam object should be readily releasable from the mold.

The invention will be further elucidated with reference to polyethylene, however it will be clear that the invention is not restricted to the use of this material but contemplates other plastic materials as well.

In general, polyethylene is marketed in granular form. However, polyethylene has to be used in powder form for applications such as rotational molding. The particle size of such powders is below about 2 mm and preferably below about 1 mm. More particularly, such powders have a particle size in the order of about 0.5 mm, e.g. about 0.3 to about 0.6 mm. In most cases the powders are prepared by grinding the granulate. Polyethylene is available in powder form if the polymerization is carried out in a so-called suspension process or a gas-phase process. However, the morphological and rheological properties of such powders are generally quite poor. Therefore such powders are first granulated and then ground.

The processing of polyethylene, in particular high-density polyethylene, takes place at temperatures above about 140° C. The granulate is therefore stabilized to protect adjacent thermal breakdown. The polyethylene is also stabilized for protection against oxidative attack and light, in particular UV radiation, to render objects made of this polyethylene more resistant to atmospheric influences. Stabilization against oxidative modification is also necessary to prevent rapid attack during processing when the polymer comes into contact with oxygen (air). In many cases small amounts of thermal and oxidative modification stabilizers are also added to polyethylene after polymerization to protect the polymer during subsequent processing. During granulation at the end of the processing operation further amounts of stabilizers are added. If the stabilizer additions are omitted, a non-stabilized or only slightly stabilized polyethylene is obtained, i.e. a polymer that contains less than about 0.01% by wt. and in particular less than 0.005% by wt. of stabilizing agents.

If such a non-stabilized or only slightly stabilized polyethylene is used to make objects in a mold, for instance by rotational molding, oxidative modifications will occur wherever the polyethylene contacts air while at an elevated temperature. In most cases air is present in the mold. Therefore, when the mold is heated, a noticeable oxidative modification of the polyethylene, such as oxidation, whether or not accompanied by chain breakdown, cross-linking, or the like will result. This gives the polyethylene improved adhesion to applied substrate material.

The presence of stabilizers results in the polyethylene being left unoxidized or almost hardly noticeably oxidized under the processing conditions. The effect of the invention is brought about by the presence of oxidized groups in the polyethylene, which groups should be capable of forming on the inner surface of the layer during processing. This can easily be demonstrated by means of infra-red analysis. The unstabilized or slightly stabilized polyethylene of the inner layer, formed on the inside surface of the first or outer layer which is formed on the mold, shows a clearly visible band at 1650–1800 $cm^{-1}$, which is indicative of C=O bonds. The stabilized polyethylene of the outer layer formed on the mold should not at all, or at most only slightly, show a band at 1650–1800 $cm^{-1}$.

If the polyurethane foam is introduced into a skin made of an unstabilized or hardly stabilized polyethylene, adhesion is found to be so strong that attempts to severe the polyethylene from the polyurethane foam ruptures the foam. The rupture does not occur at the plane of adhesion defined by the foam-polyethylene boundary.

An unstabilized or hardly stabilized polyethylene adheres strongly to polyurethane foam or other substrates. However, such a layer has insufficient resistance to atmospheric influences, so that objects made of it will weather and deteriorate in an unacceptably short time. The mechanical properties also deteriorate rapidly. Such a layer also strongly adheres to the mold wall. Release agents notwithstanding, it is extremely difficult to remove the object from the mold. Therefore, the outer layer, which contacts the mold surface during object preparations, is now made of stabilized polyethylene. The layer of unstabilized polyethylene is prepared on the interior or surface of the stabilized layer. This effects good adhesion of the substrate to the polyethylene layers, while insuring that release from the mold wall remains easy. In addition, the outer layer has good weathering resistance.

During rotational molding, the unstabilized or hardly stabilized polyolefin, such as polyethylene, will be slightly oxidized. The layer made of such polyolefin adheres strongly to substrates to which it is applied.

Infra-red analysis of two layers made by rotational molding according to the present invention clearly showed the presence of C=O groups in the inner or unstabilized layer. This was revealed by the occurrence of a band at 1650–1800 $cm^{-1}$. The outer or stabilized layer did not show a band at 1650–1800 $cm^{-1}$. It may be concluded therefore that the inner layer has been oxidized, whereas the outer layer has undergone an almost insignificant degree of oxidation.

Some oxidation of the outer layer cannot be avoided in every case. In some instances this results in the occurrence of a very weak band at 1650–1800 $cm^{-1}$. Although some oxidation is permissible, it should be avoided or at least kept to a minimum.

When layers according to the invention are made by rotational molding the amount of unstabilized polyolefin used must be chosen so as to avoid problems in stabilization. This point has to be considered in determining the quantity of unstabilized polyolefin to be used.

During layer production according to the present invention, for instance by rotational molding, migration of stabilizing agents occurs. This does not always result in a homogeneous distribution. Such a distribution will be reached in the course of time, however, as migration continues, albeit slowly, at ambient temperature. The polyolefin, for example a polyethylene, layer will eventually end up being uniformly stabilized and resistant to atmospheric influences. Of course to reach this stable and atmospheric resistant state, the polyethylene layers should contain a sufficient quantity of stabilizing agents. This should be considered when determining the amounts of stabilized and unstabilized polyethylene that will be used.

In general, stabilized polyethylene contains a minimum of about 0.01% by weight stabilizing agents. In most cases stabilized polyethylenes contain at least about 0.025% by weight of stabilizing agents.

The stability desired determines the amount of stabilizing agent incorporated in the polyethylene. In most cases more than one stabilizing agent is added, because stabilization against various effects is desired, and also because many combinations of stabilizing agents have synergetic effects on one another.

Various suitable stabilizers can be advantageously employed in practicing the present invention. There are many commercially available stabilizers. Any person being skilled in the art can make a proper selection thereof, and that is very well known in the art. What stabilizer(s) is (are) selected is immaterial. The advantages of the present invention are due to the presence of of an outer stabilized layer and an inner unstabilized or hardly stabilized layer irrespective of the kind of stabilizers present.

Low-density as well as of high-density polyethylene may be used. Generally, polyethylene with a density of at least about 0.930 g/ml is preferred.

The process according to the present invention is not limited to only polyethylene. Other polyolefins such as polypropylene are also suitable. However, of the other polymers only the polyisobutylenes have commercial importance. These are elastomers which are mostly marketed in modified form have applications primarily in other fields. Further, limited amounts of polybutylene and poly-4-methylpentene-1 are sold on the market. Besides homopolymers, many copolymers are produced. Polyolefins, such as, for example, polyethylene or polypropylene, with comparatively small amounts of comonomers, at most 10 mol %, in general, can also be employed with success. Suitable comonomers include, for example propylene, butylene, hexene, 4-methylpentene octene and so on.

The invention will be further eludicated in the following non-limiting examples showing only various preferred embodiments.

EXAMPLE 1

A hollow object is made by the rotational molding method using first a powdered polyethylene having a melt index (ASTM D-1238, condition E) of 4.5, a density of 0.938 g/ml, a mean particle size of 450 $\mu$m, and stabilized with 0.25% by weight 2-hydroxy-4-n-octoxybenzophenone and 0.05% by weight octadecyl-3-(3,5-di-tert.butyl-4-hydroxyphenyl)propionate. After a molded layer of said first powdered polyethylene is formed, a second, thinner layer is then formed on the inside surface of the first layer, using this time a powdery polyethylene having a melt index of 8, a density of 0.963, a mean particle size of 450 $\mu$m, and which contains only 0.004% by weight of the stabilizer, octadecyl-3-(3,5-di-tert.butyl-4-hydroxyphenyl)propionate. The weight amount of the total material used for this thinner layer is about ¼ of the amount of the polyolefin material used for the first outer layer. The maximum mold temperature is about 275° C., the rotation time is about 15 min. for forming the outer layer and about 5 min. for forming the inner layer.

Next, polyurethane is foamed inside the hollow object. The molded cured object could then be easily removed from the mold without difficulty. Thereafter, sections having a 5×6 cm surface area are cut from the resultant solid object, so that blocks of polyurethane foam covered on at least two sides with a polyurethane coating are obtained. These blocks are subjected to a tensile test in which an elongation rate of 1 cm/min. is applied.

The strength of the bond between the polyethylene and the polyurethane cannot be established precisely since the polyurethane foam ruptures. However, the bond strength is at least 0.260 N/mm$^2$.

COMPARATIVE EXAMPLE A

In the manner described in Example 1 a hollow object was produced exclusively of the stabilized polyethylene. Bonding strength determination presented difficulties since the polyethylene coating was already loosening when the blocks of polyurethane foam were being clamped in the machine. In the tensile strength test the polyethylene had already come clear of the foam before even a measurable value could be recorded. The plane of separation was clean, with no polyurethane foam remaining on the polyethylene.

COMPARATIVE EXAMPLE B

Example 1 was repeated, with the use of the unstabilized polyethylene only. Release from the mold was attended with severe difficulties notwithstanding the use of a strong release agent. The strenght of the bond between the unstabilized polyethylene and the polyurethane foam was at least 0.270 N/mm$^2$. In the tensile strength test the polyurethane foam ruptured.

EXAMPLE 2

Example 1 was repeated with a commercially available stabilized polyethylene having a melt index (ASTM D-1238, condition E) of 4.5, a density of 0.910 g/ml. The commercial polyethylene was ground to a mean particle size of 400 $\mu$m. A layer of polypropylene having a melt index of 10 (ASTM D-1238, condition L), a density of 0.910, and a mean particle size of 450 $\mu$m, and containing only 0.004% by wt. octadecyl-3-(3,5-di-tert.-butyl-4-hydroxyphenyl)propionate was prepared on the inside of the object. The amount of polypropylene was ¼ of the amount of polyethylene.

Also in this case, rupturing of the foam occured in the tensile test and the bonding strenght was at least 0.260 N/mm$^2$.

I claim:

1. A rotational molding process for manufacturing objects having a foamed plastic substrate adhered to a polyolefin coating layer, and having improved adhesion therebetween comprising the combination of steps of:
   (a) preparing a first outer coating layer of a stabilized polyolefin by rotational molding wherein a stabilized powdered polyolefin is introduced into a heated rotational mold and during said rotational molding said mold is heated to a temperature above the melting point of said stabilized polyolefin;

(b) forming a second inner layer of an at most slightly stabilized polyolefin contiguous with and on the interior surface of said first outer layer by rotational molding wherein an at most slightly stabilized powdered polyolefin is introduced into said rotational mold subsequent to the formation of said first outer coating layer of the stabilized polyolefin while said mold is heated; and thereafter (c) introducing a foamable plastic material onto the interior surface of the thus formed second layer in said mold and foaming said plastic thereagainst whereby the foamed plastic is bonded to said interior surface.

2. Process according to claim 1, wherein the weight amount used for said at most slightly stabilized polyolefin in step (b) is about 25 percent of the amount of said stabilized polyolefin used in step (a).

3. Process according to claim 1 or 2 wherein said at most slightly stabilized polyolefin contains less than about 0.01 percent by weight stabilizing agents and said stabilized polyolefin contains at least about 0.025% by weight of stabilizing agents.

4. Process according to claim 1, wherein the polyolefin used for said first and said second layer is polyethylene.

5. Process according to claim 1 wherein said second layer is an unstabilized polyolefin.

6. Process according to claims 1 or 2 wherein said foamable plastic material is polyurethane foam.

7. A surf board manufactured according to claims 1, 4 or 5.

8. An article of manufacture having an exterior wall composed of a first layer of a stabilized polyolefin and a second contiguous layer of an at most slightly stabilized polyolefin thereon, and a foamed plastic material bonded to the inner surface of said second layer.

9. An article according to claim 8, wherein said exterior wall encloses an interior volume, and said second layer forms the interior surface of said wall, and said foamed plastic material substantially fills said interior volume.

* * * * *